May 13, 1969 G. A. JUNKER 3,443,302
PROCESS FOR TIGHTENING SCREWS
Filed Sept. 20, 1966

Inventor:
G. A. Junker
BY Richards & Geier
ATTORNEYS

United States Patent Office 3,443,302
Patented May 13, 1969

3,443,302
PROCESS FOR TIGHTENING SCREWS
Gerhard A. Junker, Neuss (Rhine), Germany, assignor to Bauer & Schaurte, Neuss (Rhine), Germany, a firm of Germany
Filed Sept. 20, 1966, Ser. No. 580,836
Claims priority, application Germany, Feb. 17, 1966, B 85,842
Int. Cl. B23p *19/04*
U.S. Cl. 29—428                5 Claims

ABSTRACT OF THE DISCLOSURE

A process of tightening screws is shown which involves the application of oscillation energy to the screw while it is being tightened to overcome frictional lock so that the screw can be tightened with a substantially lower tightening, turning movement.

---

This invention relates to a process for tightening screws.

The dimensions and strength of power screws used for joining structural parts are determined according to the required clamping force which in turn depends upon the function and the stresses of the parts being joined.

The required pressing force of a screw and thus its strength and size are determined, on the one hand, from the required clamping force and, on the other hand, from elasticity conditions. When the screw is tightened up to this pressing force, a part of the tightening turning moment is consumed in surmounting the thread pitch, but the larger part is consumed in overcoming friction in the threads and under the head. The force moment effective in the threads, in addition to the axial pressing force, also subjects the screw shank and the free portion of the screw threads to torsional forces.

The size of the comparative stress which according to the hypothesis of the energy of form change, is composed of the tensile pressing force and torsion, should not exceed 90% of the yield point of the screw.

FIGURE 1 of the attached drawings is a diagram showing the tensile force for the tightening turning moment, specifically for the ⅜″ hex. cap screw B 18. 2.1–grade 8. It is apparent that for a friction coefficient of 0.14, which is valid for slightly oiled screws having no special surface treatment, a screw of this grade and quality can be tightened with a turning moment of 6.9 mkp. to a tensile force of 3690 kp. If the friction conditions are improved by cadmium plating the screw to a friction coefficient of 0.08, the same screw can be tightened to a substantially higher tensile force of 4140 kp. and a turning moment of 4.8 mkp. However, cadmium plating increases the costs.

It is a matter of general knowledge that friction taking place during the tightening of screws diminishes with the increase in the speed of tightening, whereby it was determined that values for the tightening with electric and pneumatic drivers, that is turn screws with the highest tightening speeds, lie about 0.02 below those for tightening by hand. Thus untreated screws do not even reach the values for cadmium plated screws.

An object of the present invention is to improve screw tightening processes.

Other objects will become apparent in the course of the following specification.

In the course of the accomplishment of the objectives of the present invention it was found that untreated lightly oiled screws can be tightened with friction values which are effectively close to zero (they were measured as being 0.001 to 0.005) when torsional oscillations are introduced into the screw during the tightening, which in the frequency of the oscillations reverse the direction of the relative movement between the outer surface of the screw (thread flanks and head support) on the one hand, and the part being joined and nut threads on the other hand. Then the oscillation energy overcomes the frictional lock, so that the screw can be tightened with a substantially lower tightening turning moment. For practical purposes this corresponds to a diminution of friction to the above-indicated values.

Figure 1:
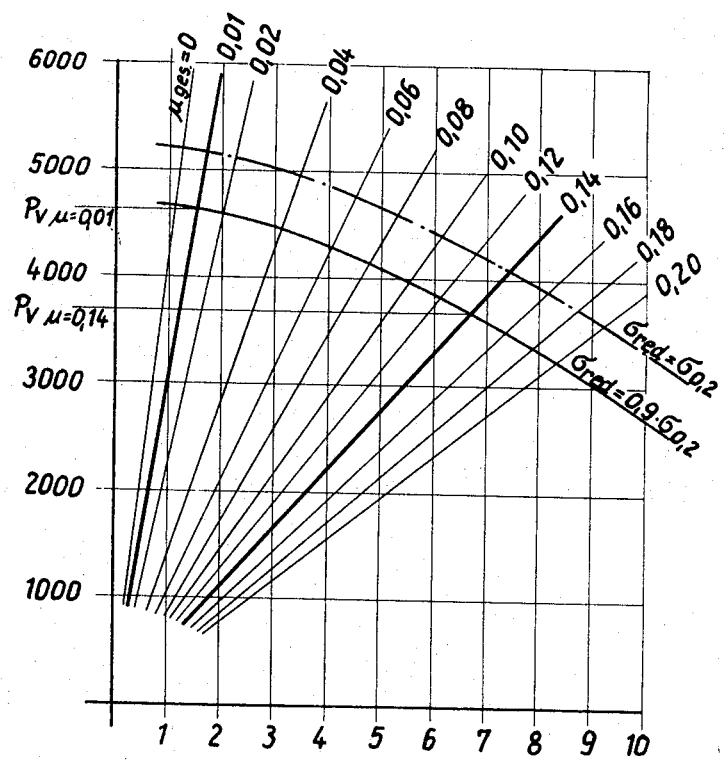
FIGURE 1 is the already described diagram showing the tensile force for the tightening turning moment.

FIG. 1 shows that with a frictional value of 0.01 for the same screw a tensile force of 4600 kp. is attained with a turning moment of 1.5 mkp. In comparison to a normal turning procedure this means an increase of 25% in the pressing force. Thus in accordance with the present invention for the same constructional requirements it will be sufficient to use a screw the cross section of which can be smaller, or the yield point of which can be lower by the same amount. They both result in cost savings and in case of a smaller cross section, the savings are further increased by reducing the sizes of the connections.

Figure 2:
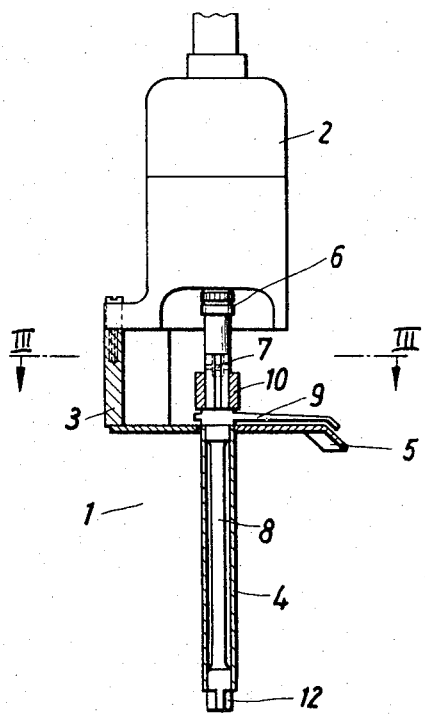
FIGURE 2 is a side view of a screw tightening device of the present invention, some parts being shown in section.
Figure 3:
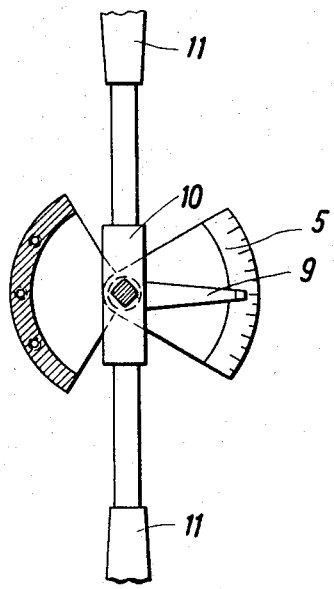
FIGURE 3 is a transverse section along the line III—III of FIG. 2.

A screw tightener of the present invention which can be operated by hand, is shown by way of example in FIGS. 2 and 3 which illustrate a torque tightener 1 having a torsion swinger 2. A support 3 rigidly connects the swinger 2 with an outer tube 4 of the tightener. The tube 4 carries a scale 5 for indicating the torque.

The torsion swinger 2 has a shaft 6 which is connected by a coupling 7 with a torsion rod 8 extending through the tube 4. The rod 8 is connected with an indicator 9 swingable over the scale . The rod 8 is also connected with a two-armed lever 10 carrying hand grips 11. The lower end of the rod 8 carries a square head 12.

The operation is as follows:

The shaft 6 of the torsion swinger 2 does not carry out a complete rotary movement but only an oscillating movement with an amplitude of a few degrees. When the user applies the apparatus for tightening or loosening a screw connection, he holds the apparatus by the handles 11 and this force serves as a brake on the shaft 6 of the swinger 2. The reaction moment which is thus produced in the apparatus imports a turning oscillation through the support 3 within the pipe 4 of the screw tightener and this oscillation is transmitted through the rod 8 upon a nut mounted over the square head 12 and thus directly to the screw or bolt which is to be tightened or loosened, whereby in the direction of rotation of the screw tightener the oscillatory movement is added to its rotary movement, but is deducted during opposite movement. If according to the present invention the frequency and the amplitude of the rotary movement are so selected that the rotary speed produced thereby is greater than the rotary speed of the torque tightener, then the screw or nut is alternately turned backwards and forwards with the frequency of the torsion swinger 2, whereby the path in the direction of rotation of the torque tightener is greater than in the opposite direction.

It is apparent that besides the described balance swinger other devices can be used for introducing torsion oscillations, for example, through a coupling between a screw head and the driving shaft of the tightening tool. Such devices can consist of a compressed air vibrator, a magnetic oscillator or a special impact tightener.

It is apparent that the process and the device of the present invention can be also used to remove screws and nuts from joined constructional elements with considerably greater ease than heretofore by dynamically reversing the procedure.

It is also apparent that other variations and modifications may be made within the scope of the present invention.

What is climed is:

1. The process of tightening screws, which comprises introducing into a screw while the screw is being tightened, torsional oscillations which in the frequency of the oscillations reverse the direction of the relative movement between the outer surface of the screw on the one hand and the part being joined and nut threads on the other hand.

2. The process in accordance with claim 1, wherein said torsional oscillations are transmitted to the screw through the coupling of the tightening tool with the screw head.

3. The process in accordance with claim 1, wherein said torsional oscillations are transmitted to the screw through the coupling of the tightening tool with the screw nut.

4. The process in accordance with claim 1, wherein said torsional oscillations are transmitted to the screw through the part being joined.

5. The process in accordance with claim 1, wherein said torsional oscillations are transmitted to the screw nut through the part being joined.

References Cited

UNITED STATES PATENTS

| 2,086,667 | 7/1937 | Fletcher | 29—407 |
| 3,142,901 | 4/1964 | Bodine | 29—525 |
| 3,184,353 | 5/1965 | Balamuth et al. | 29—526 X |

THOMAS H. EAGER, *Primary Examiner.*

U.S. Cl. X.R.

29—200, 240, 526